United States Patent

Ochi et al.

Patent Number: 5,664,523
Date of Patent: Sep. 9, 1997

[54] MATERIALS FOR THE TREATMENT OF PET EXCRETIONS

[75] Inventors: Kengo Ochi, Kawanoe; Noriyuki Kimura, Iyomishima; Yukio Zenitani, Kyoto; Masami Koike, Kyoto; Yoji Fujiura, Kyoto, all of Japan

[73] Assignee: Sanyo Chemical Industries, Ltd., Kyoto, Japan

[21] Appl. No.: 480,053

[22] Filed: Jun. 7, 1995

[30] Foreign Application Priority Data

Jun. 9, 1994 [JP] Japan .................................. 6-152585

[51] Int. Cl.⁶ .................................................. A01K 1/015
[52] U.S. Cl. .................................................. 119/173
[58] Field of Search .................................. 119/173, 171, 119/172; 424/76.6; 502/407, 437

[56] References Cited

U.S. PATENT DOCUMENTS

| | | | |
|---|---|---|---|
| 4,305,345 | 12/1981 | Otoguro | 119/172 |
| 4,355,593 | 10/1982 | Stapley | 119/171 |
| 5,078,992 | 1/1992 | Takahashi et al. | 119/76.6 X |
| 5,188,064 | 2/1993 | House | 119/172 |
| 5,193,489 | 3/1993 | Hardin | 119/173 |
| 5,207,830 | 5/1993 | Cowan et al. | 119/171 X |

FOREIGN PATENT DOCUMENTS

| | | |
|---|---|---|
| 1-108927 | 4/1989 | Japan . |
| 3-6767 | 1/1991 | Japan . |
| 3-46089 | 7/1991 | Japan . |

*Primary Examiner*—Robert P. Swiatek
*Assistant Examiner*—Yvonne R. Abbott
*Attorney, Agent, or Firm*—Finnegan, Henderson, Farabow, Garrett and Dunner, L.L.P.

[57] ABSTRACT

A material for treating excretions of pet animals which is obtainable by combining pulp (A), inorganic substance (B), guar gum (C) and optionally water-absorbent resin (D) to form guranules. The weight ratios of (A) to (B) to (C) to (D) is 15–55:15–55:5–40: 5–45.

The treating material is capable of absorbing liquids from excretions quickly, forming into clumps when absorbing liquid and maintaining the shape of the clump even when handled for removal.

14 Claims, No Drawings

MATERIALS FOR THE TREATMENT OF PET EXCRETIONS

BACKGROUND OF THE INVENTION

1. Field of the Invention

This invention relates to materials used in the treatment of pet and animal excretions. Specifically, this invention relates to materials that enable the convenient and effective treatment of cat, dog, and other animal excretions.

2. Description of the Prior Art

Sand has traditionally been used in the treatment of pet and other animal excretions. Sand is spread in the animal's cage or litter box and replaced after the animal deposits its excretions there. This is an inconvenient method, however, because pieces of sand containing animal excretions are scattered outside of the intended area when the animal enters and leaves the cage or litter box. For this reason, there have been recent attempts to find materials that readily absorb liquids and that have granules, which, after absorbing liquid, readily adhere together to form into clumps, thereby inhibiting the scattering of particles and enabling easy disposal.

Testing has been conducted on methods of using bentonite and other crushed clayey minerals; starch, CMC, and other viscous substances; water-absorbent resins; and other means of meeting the requirements. In particular, there have been recent studies on a variety of materials that employ water-absorbent resins. Known examples include a product obtained by mixing zeolite particles and other inorganic particles with specific amounts of water-absorbent resin and water, then granulating the mixture (Japanese Patent Application Laid-Open No. 108927/1989); a material obtained by granulating, then drying, a composition derived from paper-making residue, water-absorbent resin, and water-soluble inorganic salts (Japanese Patent Publication No. 6767/1991); and a material obtained by granulating a composition derived from natural organic substance, water-absorbent resin, and a binder (JP-B-46089/1991).

However, materials using bentonite or other crushed clayey minerals or using starch, CMC, or other viscous substances are slow to absorb excretions and absorb only small quantities. The result is that the excretions work its way to the bottom of the cage or litter box and soils it, or spreads out horizontally, not allowing sufficient clumping together of the granules. Problems also occur when the surface of the material becomes sticky and adheres to the animal's paws or fur. Testing was conducted on reducing the diameter of the granules (to 1–2 mm), in an attempt to improve absorbing speed. While a small improvement in absorbing speed was achieved, the granules were so small that they slipped up and under the nails of the pets and other animals, only to fall out after the animals left the cage or litter box, soiling the room and creating a new problem. The ability to absorb liquid is improved by using granulated materials made by combining water-absorbent resin with either inorganic granules, paper-making residue, natural organic matter, or other materials. However, these components swell as they absorb liquid, resulting in the granules of water-absorbent resin either becoming detached or disintegrating, which, in turn, renders it difficult for clumps to maintain their shape.

An even more detailed explanation reveals that although pulp has a high water-absorbency speed, its specific gravity is so low that it sticks to the paws and fur of pets, after which it soils the room. It would seem easy to solve this problem by adjusting the overall specific gravity of the resultant material by combining pulp with an inorganic substance having a higher specific gravity. Pulp is not easily granulated, however, when combined with inorganic substance alone. This brings up the question of employing a binder. Using acrylic resins, butyl rubber, and other synthetic resins or synthetic rubbers does enable easy granulation, but the material obtained from these processes has a slow water-absorption speed. Adding starch, CMC, or other natural high-molecules or water, then granulating the composition, does prevent a large reduction in water-absorption speed, but the grains that have absorbed the liquid will not clump together.

SUMMARY OF THE INVENTION

Objects and Features of the Invention

The inventors have solved the problems indicated above. The inventors conducted careful studies to find materials for use in the treatment of pet excretions that absorb liquids from excretions quickly, that form into clumps when absorbing liquid, and that maintain the shape of the clump even when handled for removal. As a result of their studies, the inventors found that by adding guar gum to pulp and an inorganic substance: granules are easily formed, the granular substance that is obtained loses no water-absorption speed, the granules swell to an appropriate degree when absorbing water, and the granules adhere to each other to form into clumps, without falling apart.

Therefore, an object of the invention is to provide an improved materials for the treatment of pet excretions which is capable of absorbing a given amount of urine with less consumption of the treating material in a short period of time.

It is a further object of the invention to provide materials for the treatment of pet excretions which may easily adhere to each other to quickly form agglomerated lumps when urine is absorbed, so that the part which has absorbed excretion can be easily removed for disposal.

This invention is a treating material (hereafter, referred to as the "Treating Material") made by granulating a mixture of pulp (A), inorganic substance (B), and guar gum (C), which are designed for use in the treatment of pet animal excretions.

Effect of the Invention

1. Individual granules of the Treating Material adhere to each other after absorbing liquid and form into a single, gummous clump. Clumps are then easily removed from the rest of the Treating Material and disposed of. There is little odor, because the smell remains trapped inside the clumps.

2. The Treating Material absorbs liquids quickly. This allows the surface of the Treating Material to promptly return to a semi-dry condition, so that urine does not stick to the paws or fur of the pet or other animal and does not soil the room or anything else.

The above description of the efficacy of this invention shows that it is useful in the treatment and disposal of pet and other animal excretions.

DETAILED DESCRIPTION OF THE INVENTION

The pulp (A) used in this invention can be, for example, any one or a combination of two or more of the following kinds of pulp: mechanical pulp (e.g., direct ground pulp and Asplund-processed ground pulp), chemical pulp (e.g., sulfite pulp, soda pulp, sulfate pulp, nitrate pulp, and chlorine pulp), semichemical pulp, regenerated pulp (e.g., mechanically shredded or pulverized material made from screened paper or recycled paper), or other kinds of waste material (e.g., the byproducts from the manufacture of paper diapers). The pulps that work best with this invention, from among the above examples, are chemical pulp, regenerated pulp, and the byproducts from the manufacture of paper diapers. The pulp (A) that is to be used can be powdered, fibrous, or in other forms. The length of each segment of fiber is not particularly limited, but in general, they are to be 20 mm in length or shorter; ideally, they are to be 10 mm or shorter.

The inorganic substance (B) used in this invention can be, for example, any one or a combination of two or more of the following kinds of inorganic substances: calcium carbonate, zeolite, kaolin, bentonite, pearlite, talc, foamed calcium silicate (ALC), acid clay, silica sand, diatomaceous earth, or alumina. The inorganic substances that work best with this invention, from among the above examples, are calcium carbonate, zeolite, kaolin, pearlite, talc, bentonite, ALC, and acid clay. Average grain size of the inorganic substance (B) used in this invention is generally 45–1700 µm; ideally, it is 60–300 µm.

The guar gum (C) used in this invention is a kind of powderized plant mucilage. It is derived by refining, then powderizing the mucilaginous substance obtained from the albumen of the seed of a legume known as the guar plant. This substance is commonly used throughout industry, in such items as frozen foods, noodles, sauces, and other foodstuffs, as well as in pharmaceutical products, cosmetics, wall-paper paint, and animal feed. The Treating Material contains the guar gum (C) in powder shape, and average grain size of the guar gum (C) used in this invention is generally 45–1700 µm; ideally, it is 60–500 µm.

According to the invention, firm and gummous clumps of the Treating Material after absorbing liquid can be obtained by using said guar gum (C), which generally has the above-mentioned grain size.

When the average grain size of (C) is less than 45 µm or more than 1700 µm, the clumps cannot be easily formed or do not become firm, even if the clumps can be picked up, and in this case, missing of part or parts of their edge or some cracks will be observed in many cases.

Water-absorbent resin (D) can also be added to the Treating Material to further improve its ability to form into clumps after absorbing liquid. One example ① of a water-absorbent resin (D) used for this purpose can be that obtained by polymerizing as the essential components: starch or cellulose (hereafter referred to as component (a)); water-soluble monomer that contains a carboxyl group, a sulfonate group, or other hydrophilic groups and/or a monomer rendered water-soluble through hydrolysis (hereafter referred to as component (b)); and a crosslinking agent (hereafter referred to as component (c)), and subsequently performing hydrolysis, as necessary.

The details concerning components (a), (b), and (c), listed above, which are used in the manufacture of the water-absorbent resin described above, and the proportions and methods of manufacture of these components (a), (b), and (c), as well as concrete examples of the resins are described in Japanese Patent Application Laid-Open No. 25886/1977, Japanese Patent Publication No. 46199/1978, No. 46200/1978, and No. 21041/1980.

Example of (a) include raw starches such as sweet potato starch, potato starch, wheat starch, corn starch, rice starch, and tapioca starch: processed starch such as oxidized starch, dialdehyde starch, alkylated starch, oxy alkylated starch, amino-ethylated starch, and cyanoethylated starch; and celluloses such as natural cellulose, carboxymethylcellulose, and cellulose ether.

Example of (b) include monomers possessing a carboxyl group such as (meth)acrylic acid and maleic anhydride: monomers possessing a carboxylate group such as sodium (meth)acrylate, sodium maleate, trimethylamine salt of (meth)acrylic acid, and triethanolamine salt of (meth)acrylic acid: monomers possessing a sulfonic acid group such as vinyl sulfonic acid, vinyl toluene sulfonic acid and sulfopropyl (meth)acrylate: and monomers possessing a sulfonate group such as sodium vinyl sulfonate, methylamine salt of vinyl sulfonic acid, and diethanolamine salt of sulfopropyl (meth)acrylate.

Example of (c) include polyols such as ethyleneglycol and trimethylolpropane; bisacrylamides such as N,N-methylene-bisacrylamide; multifunctional (meth)acrylic esters such as ethyleneglycol di(meth)acrylate, polyethyleneglycol di(meth)acrylate, and trimethylolpropane tri(meth)acrylate; methylol(meth)acrylamide; glyoxal; etc.

Four more examples (②) through (⑤) of water-absorbent resins, in addition to the example described above, are as follows: ②—those obtainable by polymerizing the components (a) and (b), e.g., a hydrolyzed product of starch-acrylonitrile graft polymer and a hydrolyzed product of cellulose-acrylonitrile graft polymer; ③—crosslinked material of component (a), e.g., a crosslinked product of carboxyl methylcellulose; ④—a copolymer of components (b) and (c), e.g., a partially-hydrolyzed product of crosslinked polyacrylamide, crosslinked acrylic acid-acrylamide copolymer, crosslinked sulfonated polystyrene, saponified vinylester-unsaturated carboxylic acid copolymer disclosed in Japanese Patent Application Laid-Open No. 14689/1977 and No. 27455/1977, salt of crosslinked polyacrylic acid, crosslinked acrylic acid-acrylic acid ester copolymer, crosslinked isobutylene-maleic acid anhydride copolymer, and crosslinked carboxylic-acid denatured polyvinyl alcohol; and ⑤—a self crosslinking polymerization product using component (b), e.g., self crosslinkable polyacrylates. The water-absorbent resins presented as examples above may also be employed in combinations of two or more.

The water-absorbent resins that work best with this invention are above ① and Some of ④ such as the partially-hydrolyzed product of crosslinked polyacrylamide, crosslinked acrylic acid-acrylamide copolymer, crosslinked polyacrylic acid, crosslinked acrylic acid-acrylic acid ester copolymer, crosslinked isobutylene-maleic acid anhydride copolymer, and crosslinked carboxylic acid denatured polyvinyl alcohol.

The water-absorbent resin (D) mentioned above has a water absorption capability with respect to pure water of at least 50 ml/g in general, and should ideally be able to absorb 100–1,000 ml/g. This resin (D) is generally a fine powder with a particle size of generally 1–840 µm; ideally, it is 5–300 µm. When the particle size of (D) is less than 1 µm or more than 840 µm, the initial water-absorption speed becomes to be down.

There are no specific limits to the proportions of pulp (A), inorganic substance (B), or guar gum (C) to be mixed together for this invention, but ideal weight ratios of pulp (A) to inorganic substance (B) to guar gum (C) would be 15–55:15–55:5–60. When water-absorbent resin (D) is added, the relative proportions by weight of (A) to (B) to (C) to (D) would be 15–55:15–55: 5–40:5–45; ideally, the ratio of (A) to (B) to (C) to (D) would be 25–50:25–50:5–30:20–40. If the pulp (A) and inorganic substance (B) fall below 15 respectively, in the above ratios, the shape of the grain does not change when water is absorbed and swelling does not occur readily, resulting in insufficient clumping. On the other hand, if the pulp (A) goes beyond 55 in the above ratios, absorption speed declines. If the inorganic substance (B) exceeds 55, in the above ratios, the specific gravity of the Treating Material grows larger, making it inconvenient to carry. If the guar gum (C) falls below 5, in the above ratios, there is insufficient clumping when water is absorbed; on the other hand, if the guar gum (C) exceeds 60, the grains cause blocking on days with high humidity and the granules have trouble absorbing liquid all the way to their cores.

There are two methods of manufacturing the Treating Material pertaining to this invention as illustrated below: ①

Small amounts of water can be added to the pulp (A), inorganic substance (B), guar gum (C), and, when necessary, water-absorbent resin (D) (hereafter, referred to (A), (B), (C) and (D), collectively as the "base material"), as this base material is being stirred, thereby forming granules; or ② The base material can be formed into granules using compression.

When the manufacturing method ① is used in which small amounts of water are added as the base material is stirred, the base material is put inside either a Nauta mixer, ribbon mixer, conical blender, mortar mixer, or all-purpose mixer, then small quantities of water are added as uniformly as possible, while the base material is being stirred. This simple process results in the formation of the necessary granules. Water can be added to the base material while it is being stirred by a variety of methods, including spraying it on, blowing it on in the form of water vapor, or by storing the base material in high humidity and allowing it to absorb moisture. When necessary, inorganic salts, alcohol, ethylene glycol, propylene glycol, glycerol, polyethylene glycol, polyvinyl alcohol, surface-active agents, or other substances can be added to achieve a binding effect or to increase the permeability of the water into the granulated material.

The amount of water that is added differs depending on the kind of base material used. Generally, however, the amount of water used is from 1% to 30% of the overall weight; ideally, it is from 2% to 15% of the overall weight. If the amount of water added exceeds 30% of the overall weight, the granules become soft, lose their shape, and cling together. If too much water is added, the granules that are already formed can be dried. However, re-drying base material that has had too much water added to it is not economically sound; also, the resultant granules are hard and lack air space, and their absorbing speed is reduced. If the amount of water added falls below 1% of the overall weight, granules cannot be sufficiently formed. Adding an appropriate amount of water to the base material to form granules in a way that does not require re-drying is the best method of producing the granules, because it increases absorbing speed and is economical.

The speed of granule formation, the strength of the formed granules, and other aspects of the granules can be improved by forming the granules at a temperature of between 40° and 90°.

Concrete examples of the method ② of producing the Treating Material whereby base material is formed into granules using compression include: using a mold that is designed with the appropriate shape and size, then pressure-molding the Treating Material into pellets; and, pressure-molding the Treating Material into either sheets, bars, or blocks, first, then cutting or crushing it into the appropriate size. The above pressure-molding methods are conducted at room temperature, but conducting them at higher temperatures (e.g., 30°–300° C.) or increased humidity (e.g., 2–100%) will not obstruct the process.

The appropriate degree of compression to be used in this process can be selected based on the type of base material, the size of the granules, the overall property of the mixture, and other factors. Normally, the pressure is to be from 1 to 3,000 Kg/cm²; ideally, it is to be from 10 to 2,000 Kg/cm². Pressure-molding can be conducted using a roller-type pressure-molding machine (e.g., a compacting press machine or a bricketting press machine), a piston-type pressure-molding machine, a screw-type pressure-molding machine, a perforated extrusion-molding machine, or other kinds of pressure-molding machines. The resultant material from this pressure molding an be further cut or broken up, as necessary, to achieve the appropriate shape and size of granule.

The Treating Material pertaining to this invention can be formed into a wide variety of shapes, as desired. For example, it can be formed into spherical, cylindrical, plate-like, rock-like, rectangular, conical, pyramidal, rod-like, and so forth. Granules preferably have a maximum diameter of from 2 to 15 mm, no matter what the shape; ideally, the diameter is from 3 to 10 mm. If the diameter of the granules falls below 2 mm, the granules will get caught under the animal's nails and will then be scattered about the room. If the granules exceed 15 mm in diameter, they will not form sufficiently into clumps after absorbing urine. Bulk specific gravity of the Treating Material is from 0.2 to 1.0 ideally, it is from 0.3 to 0.7 g/ml. If the specific gravity falls below 0.2 g/ml, the Treating Material is too light and will be scattered around when the animal digs or otherwise kicks the Treating Material around. If the specific gravity exceeds 1.0 g/ml, the Treating Material becomes too heavy for convenient carrying.

The following pharmaceuticals, such as starch, CMC, or other thickeners; deodorizers; perfumes; germicide; mold-proofing agents; antiseptics; antiblocking agents; surface active agents; substances favored by animals, such as silvervine for cats; and fillers, can be included in the Treating Material, if necessary, with each item occupying from 0.01% to 10% of the overall weight. The surface of the Treating Material can also be coated with water-absorbent resin, in powdered form. The amount of resin to be used and the method of coating the Treating Material described in Japanese Patent Application Laid-Open No.335841/1992 will work well.

The Treating Material can simply and easily be used as a toilet area, by, for example, spreading it throughout the pet's cage, litter box, or other container. When a cat, dog, or other animal deposits excretions in this "toilet," the Treating Material quickly absorbs the liquid content of the excretions and the individual granules of the Treating Material that have absorbed the liquid stick together, forming a gummous clump, which can be easily picked up and removed from the rest of the Treating Material for convenient disposal.

DESCRIPTION OF THE PREFERRED EMBODIMENTS

This invention is further explained with the examples and descriptions of the preferred embodiments of the invention, below; this invention is not, however, limited to these examples and descriptions.

The criteria used in the evaluation of the materials are as follows.

[Evaluation of ability to form into clumps]

Artificial urine was applied to various kinds of the Treating Material and the time required for the granules to be formed into clumps was measured.

⊙—Granules absorbed artificial urine drops and clumped together within 10 seconds after the drops were applied.

○—Granules absorbed artificial urine drops and clumped together 10–30 seconds after the drops were applied.

△—Granules absorbed artificial urine drops and clumped together 30 seconds—5 minutes after the drops were applied.

X—Granules absorbed artificial urine drops but did not clump together, even 5 minutes after the drops were applied.

[Evaluation of ability of clumps to maintain shapes]

Artificial urine drops were applied to various kinds of Treating Material, and 5 minutes after the application, the formed clumps of granules were picked up by hand so as to evaluate the ability to maintain their shape.

○—Firm and gummous; maintain their shape well and are easily picked up.

A—Missing part or parts of their edges and are cracked, but can be picked up.

X—Fall apart easily and cannot be picked up.

EXAMPLE 1

A total of 350 g regenerated pulp (average length: about 10 mm), 350 g kaolin, and 300 g guar gum (base material) were put into a small-sized all-purpose 2-liter mixer that had been pre-heated to approximately 50° C. Then, 50 ml of water was added gradually, while the base material was being stirred. Next, the mixture was cut into lengths of 7 mm and formed into granules with using a perforated extrusion-molding machine; and thereby, made into cylindrical-shaped Treating Material. Bulk specific gravity was 0.60 g/ml.

This material was spread to form a level layer 3-cm-thick. Next, 30 cc of artificial urine was dripped onto the Treating Material, vertically, from 20 mm high, for a five-second period. The material was then evaluated for its ability to be formed into clumps and the ability of the clumps to maintain their shapes. The results are shown in Table 1.

EXAMPLES 2 TO 5

Examples 2 through 5 were performed using similar methods to those used in Example 1, but the types and amounts of inorganic substances used and the amounts of pulp and guar gum used were changed. The results of the testing performed on examples 2 through 5 are also shown in Table 1.

TABLE 1

| No. | EXAMPLE | | | | |
|---|---|---|---|---|---|
| | 1 | 2 | 3 | 4 | 5 |
| [Composition] (g) | | | | | |
| Pulp | 350 | 400 | 450 | 350 | 350 |
| Inorganic substance | | | | | |
| Zeolite | | | | | 350 |
| Kaolin | 350 | 400 | 450 | | |
| bentonite | | | | 350 | |
| Guar gum | 300 | 200 | 100 | 300 | 300 |
| [Properties] | | | | | |
| Average diameter of granules | 7 | 7 | 7 | 7 | 7 |
| Bulk specific gravity (g/ml) | 0.60 | 0.61 | 0.60 | 0.60 | 0.60 |
| [Evaluation] | | | | | |
| Ability to form clumps | ○ | ○ | ○ | ○ | ○ |
| Ability of clumps to maintain shape | ○ | ○ | ○ | ○ | ○ |

Note:
Each average grain size of inorganic substances and guar gum is as follows.
 Zeolite: about 75 μm
 Kaolin: about 75 μm
 Bentonite: about 75 μm
 Guar gum: about 75 μm

EXAMPLE 6

A total of 300 g regenerated pulp, 300 g kaolin, 100 g guar gum, and 300 g sodium polyacrylate water-absorbent resin ("SANWET IM-5000MPS," manufactured by SANYO CHEMICAL INDUSTRIES, LTD.) were mixed, formed into granules, and tested using similar methods to those used in Example 2. The results of this test are shown in Table 2.

EXAMPLES 7 TO 11

Examples 7 through 11 were conducted using similar methods to those used in Example 6, but the type and amount of water-absorbent resin were changed. The results of the testing conducted on examples 7 through 11 are also shown in Table 2.

TABLE 2

| No. | EXAMPLE | | | | | |
|---|---|---|---|---|---|---|
| | 6 | 7 | 8 | 9 | 10 | 11 |
| [Composition] (g) | | | | | | |
| Pulp | 300 | 250 | 300 | 300 | 400 | 400 |
| Inorganic substance | | | | | | |
| Zeolite | | | | | | |
| Kaolin | 300 | 250 | 300 | 300 | 300 | 400 |
| bentonite | | | | | | |
| Guar gum | 100 | 100 | 100 | 100 | 100 | 100 |
| Water-absorbent resin | | | | | | |
| Polymer A | | | 300 | | | |
| Polymer B | 300 | 400 | | | | 100 |
| Polymer C | | | | 300 | | |
| Polymer D | | | | | 300 | |
| [Properties] | | | | | | |
| Average diameter of granules (mm) | 7 | 7 | 7 | 7 | 7 | 7 |
| Bulk specific gravity (g/ml) | 0.66 | 0.67 | 0.65 | 0.65 | 0.65 | 0.65 |
| [Evaluation] | | | | | | |
| Ability to form clumps | ◉ | ○ | ◉ | ◉ | ◉ | ○ |
| Ability of clumps to maintain shape | ○ | ○ | ○ | ○ | ○ | ○ |

Note:
Each average grain size of inorganic substances and guar gum is as follows.
 Kaolin: about 75 μm
 Guar gum: about 75 μm The distribution of particle sizes of the water-absorbent resins (Polymer A–D) used in each of the above examples was from 5μm to 300 μm, and average particle sizes of these samples were from 20 μm to 50 μm.

Types of water-absorbent resins (Main components)

Polymer A—Trade name: "SANWET IM-1000MPS" (manufactured by SANYO CHEMICAL INDUSTRIES, LTD.); a starch/sodium acrylate graft polymer water-absorbent resin Polymer B—Trade name: "SANWET IM-5000MPS" (manufactured by SANYO CHEMICAL INDUSTRIES, LTD.); a crosslinked sodium polyacrylate water-absorbent resin Polymer C—A crosslinked polyvinyl alcohol/sodium polyacrylate water-absorbent resin Polymer D—An crosslinked isobutylene/sodium maleate copolymer water-absorbent resin

COMPARISON 1

Crushed bentonite, having average diameter of 7 mm and bulk specific gravity of 0.99 g/ml, was tested using the same methods used in Example 1. The results of the test are shown in Table 3.

COMPARISONS 2 TO 5

The components listed in Table 3 were mixed, formed into granules, and tested using similar methods to those used in Example 1, above. The results of these tests are also shown in Table 3.

TABLE 3

| No. | COMPARISON | | | | |
|---|---|---|---|---|---|
| | 1 | 2 | 3 | 4 | 5 |
| [Composition] (g) | | | | | |
| Pulp | | 500 | 500 | 350 | 350 |
| Inorganic substance | | | | | |
| Zeolite | | | | | |
| Kaolin | | 500 | | 350 | 350 |
| bentonite | 1000 | | 500 | | |
| Guar gum | | | | | |
| CMC | | | | 300 | |
| Water-absorbent resin | | | | | |
| Polymer B | | | | | 300 |
| [Properties] | | | | | |
| Average diameter of granules (mm) | 7 | 7 | 7 | 7 | 7 |
| Bulk specific gravity (g/ml) | 0.99 | 0.60 | 0.60 | 0.63 | 0.65 |
| [Evaluation] | | | | | |
| Ability to form clumps | x | x | x | Δ | Δ |
| Ability of clumps to maintain shape | x | x | x | x | x |

Note:
Each average grain size of inorganic substances and CMC is as follows.
  Kaolin: about 75 μm
  Bentonite: about 75 μm
  CMC: about 50 μm The results shown in tables 1 through 3 indicate that when the granulated materials made from pulp, inorganic substance, and guar gum (examples 1–5) are compared to the granulated materials that do not contain guar gum (comparisons 1–5), the materials containing guar gum demonstrate superior ability both in the formation of clumps, in the ability of those clumps to maintain their shapes after absorbing water, and in the easiness of picking out the water-absorbed clumps from the rest of the Treating Material, and thereby enabling simple use. Also, there is less odor with the material containing guar gum, because the smell remains trapped inside the clumps. Granulated materials made with pulp, inorganic substance, guar gum, and water-absorbent resin (examples 6–11) showed even better ability to form into clumps and released little odor, thereby enabling even simpler use.

What is claimed is:

1. A material for treating excretions of pet animals, which comprises granules formed of a mixture of pulp (A), an inorganic substance (B) and guar gum (C), wherein the weight ratios of (A) to (B) to (C) are 15–55:15–55: 5–60.

2. The material for treating excretions of pet animals according to claim 1, wherein the inorganic substance (B) is at least one selected from the group consisting of: calcium carbonate, zeolite, kaolin, bentonite, pearlite, talc foamed calcium silicate and acid clay.

3. The material for treating excretion of pet animals according to claim 1, wherein the average grain size of the inorganic substance (B) is 60–300 μm.

4. The material for treating excretions of pet animals according to claim 1, wherein the average grain size of the guar gum (C) is 60–500 μm.

5. The material for treating excretions of pet animals according to claim 1, wherein the average diameter of said granules formed is form 3 to 10 mm and the bulk specific gravity is from 0.3 to 0.7 g/ml.

6. A material for treating excretions of pet animals, which comprises granules formed of a mixture of pulp (A), an inorganic substance (B), guar gum (C) and a water-absorbent resin (D).

7. The material for treating excretions of pet animals according to claim 6, wherein the weight ratios of (A) to (B) to (C) to (D) is 15–55:15–55:5–40:5–45.

8. The material for treating excretions of pet animals according to claim 6, wherein the weight ratios of (A) to (B) to (C) to (D) is 25–50:25–50:5–30: 20–40.

9. The material for treating excretions of pet animals according to claim 6, wherein the inorganic substance (B) is at least one selected from the group consisting of: calcium carbonate, zeolite, kaolin, bentonite, pearlite, talc, foamed calcium silicate and acid clay.

10. The material for treating excretions of pet animals according to claim 6, wherein the average grain size of the inorganic substance (B) is 60–300 μm.

11. The material for treating excretions of pet animals according to claim 6, wherein the average grain size of the guar gum CC) is 60–500 μm.

12. The material for treating excretions of pet animals according to claim 6, wherein the water-absorbent resin (D) has a water absorption capability with respect to pure water of 100–1,000 ml/g.

13. The material for treating excretions of pet animals according to claim 6, wherein the water-absorbent resin (D) is a fine powder having a diameter of 5–300 μm in pulverized form.

14. The material for treating excretions of pet animals according to claim 6, wherein the average diameter of said granules formed is from 3 to 10 mm and the bulk specific gravity is from 0.3 to 0.7 g/ml.

* * * * *

UNITED STATES PATENT AND TRADEMARK OFFICE
CERTIFICATE OF CORRECTION

PATENT NO. : 5,664,523
DATED : September 9, 1997
INVENTOR(S) : Kengo Ochi et al.

It is certified that error appears in the above-indentified patent and that said Letters Patent is hereby corrected as shown below:

Title page, item [73], "Assignee:" should read --Sanyo Chemical Industries, Ltd., Kyoto, Japan and Uni-Charm Corporation, Ehime, Japan--.

Signed and Sealed this

Fourth Day of July, 2000

Attest:

Q. TODD DICKINSON

*Attesting Officer*  *Director of Patents and Trademarks*